United States Patent [19]

Dean et al.

[11] Patent Number: 5,258,242
[45] Date of Patent: Nov. 2, 1993

[54] ELECTROCHEMICAL CELL HAVING IMPROVED PRESSURE VENT

[75] Inventors: Kevin Dean, Pontiac; Arthur Holland, Troy; Donn Fillmore, Waterford, all of Mich.

[73] Assignee: Ovonic Battery Company, Inc., Troy, Mich.

[21] Appl. No.: 14,965

[22] Filed: Feb. 8, 1993

[51] Int. Cl.$^5$ .............................................. H01M 2/12
[52] U.S. Cl. ........................................ 429/54; 429/55; 429/82
[58] Field of Search ................ 429/54, 53, 55, 57, 429/82, 89; 220/203

[56] References Cited

U.S. PATENT DOCUMENTS

| | | | |
|---|---|---|---|
| 4,078,121 | 3/1978 | Gratzmuller | 429/54 |
| 4,328,290 | 5/1982 | Szymborski et al. | 429/89 X |
| 4,338,382 | 7/1982 | Fritts | 429/53 |

Primary Examiner—Anthony Skapars
Attorney, Agent, or Firm—Marc Luddy; Marvin Siskind; Dave Schumaker

[57] ABSTRACT

The electrochemical cell of the instant invention includes a case having a gas outlet, one or more positive electrodes positioned within the case, one or more negative electrodes positioned within the case electrode separators positioned between the positive and negative electrodes, electrolyte positioned within the case, and a pressure vent for releasing internal pressure occurring in the case to the surrounding atmosphere. The pressure vent is affixed to the case covering the gas outlet, the pressure vent includes a vent housing having a hollow interior area in gaseous communication with the surrounding atmosphere and the interior of the case via the gas outlet, a pressure release piston positioned within the hollow interior area, the pressure release piston sized to surround the gas outlet and having a seal groove configured to encapsulate all but one surface of a seal mounted within the seal groove, leaving the non-encapsulated surface of the seal exposed, and a compression spring positioned to urge the pressure release piston to compress the seal in the seal groove and block the gas outlet in the case.

19 Claims, 2 Drawing Sheets

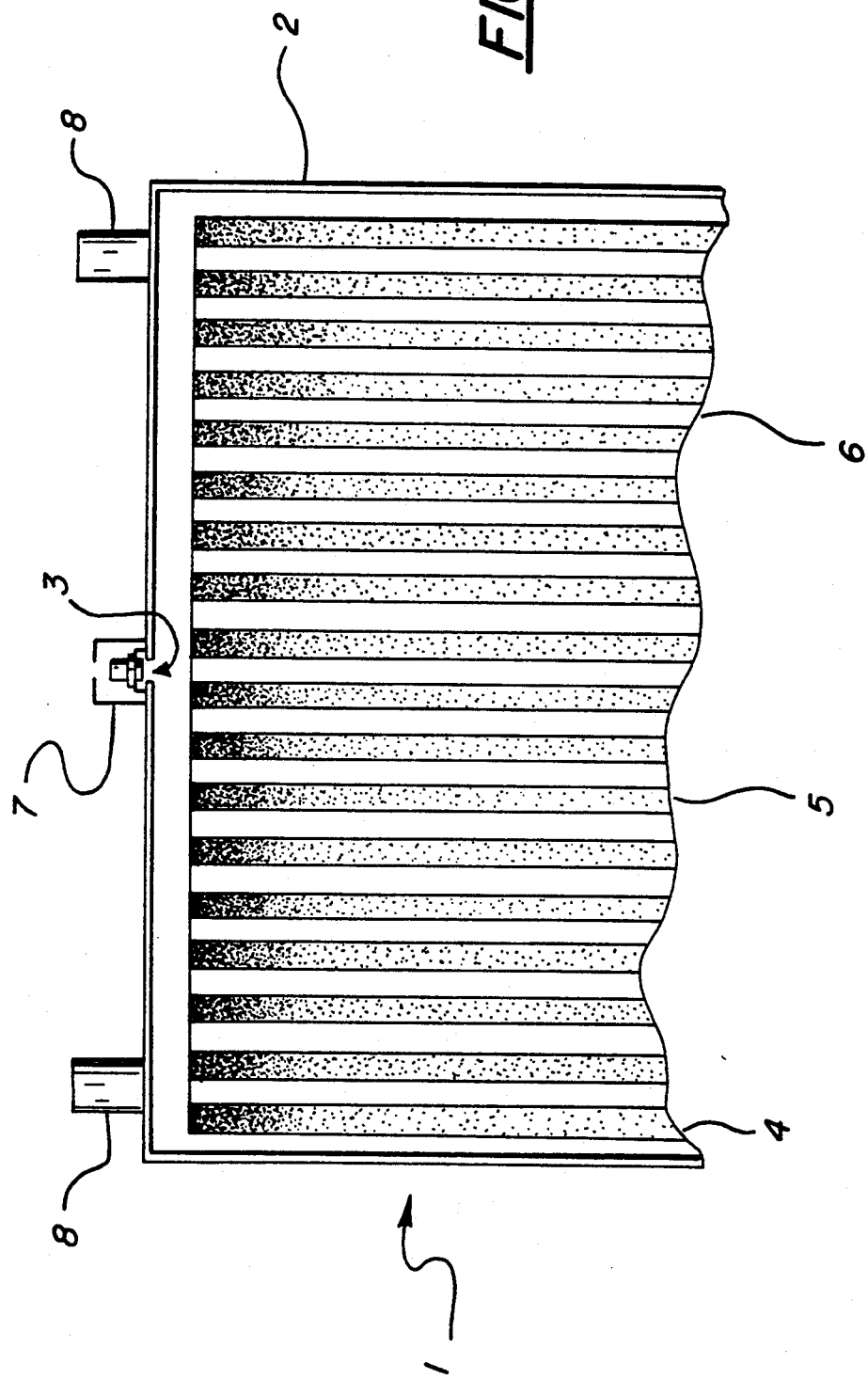

ELECTROCHEMICAL CELL HAVING IMPROVED PRESSURE VENT

FIELD OF THE INVENTION

The present invention relates generally to rechargeable electrochemical cells, and more particularly to rechargeable electrochemical cells with hydrogen storage negative electrodes having an improved, resealable pressure vent assembly for releasing hydrogen gas pressure occurring within the electrochemical cell.

BACKGROUND OF THE INVENTION

Rechargeable prismatic batteries are used in a variety of industrial and commercial applications such as fork lifts, golf carts, and non-interruptible power supplies for protection of electronic data storage. When electric vehicles are manufactured in mass, they will undoubtedly use some kind of prismatic battery.

Rechargeable lead-acid batteries are the most widely used type of battery. Lead-acid batteries are an excellent power source for starting motors for internal combustion engines. However, the low energy density (30 wh/kg) provides insufficient vehicle range (30 to 120 miles) before requiring a recharge. Slow recharge capability (6 to 12 hours) and the use of toxic materials make lead-acid impractical. In addition, electric vehicles using lead-acid batteries have sluggish acceleration, top speeds of only 50 to 60 mph, and a lifetime of 20,000 miles.

Nickel metal hydride batteries ("Ni-MH batteries") are far superior to lead acid batteries, and Ni-MH prismatic batteries are the most promising type of battery available for electric vehicles. For example, Ni-MH batteries, such as those described in copending U.S. patent application Ser. No. 934,976 filed Aug. 25, 1992 to Ovshinsky and Fetcenko, the contents of which are incorporated by reference, have a much better energy density than lead-acid batteries: they can power a vehicle over 250 miles before requiring a recharge, they can be recharged in less than one hour, and they contain no toxic materials. Electric vehicles using Ni-MH batteries would have an acceleration of 0-60 in 8 seconds, a top speed of 100 mph, and a lifetime of more than 100,000 miles.

A rechargeable electrochemical cell is ideally suited to serve as a portable power source due to its small size, light weight, high power capacity and long operating life. A rechargeable cell may operate as an "install and forget" power source. With the exception of periodic charging, such a rechargeable cell typically performs without attention and rarely becomes the limiting factor in the life of the device it powers.

Secondary cells using a rechargeable hydrogen storage negative electrode are known in the art. See, for example, U.S. Pat. No. 4,551,400 (hereinafter "the 400 patent") for HYDROGEN STORAGE MATERIALS AND METHODS OF SIZING AND PREPARING THE SAME FOR ELECTROCHEMICAL APPLICATIONS, the disclosure of which is incorporated herein by reference. (Cells using rechargeable electrochemical hydrogen storage negative electrodes are hereinafter referred to as "hydrogen storage cells.") Hydrogen storage cells operate in a different manner from lead-acid, nickel-cadmium, or other prior art battery systems. The metal hydride negative electrode used in these cells is capable of the reversible electrochemical storage of hydrogen. In hydrogen storage cells, the positive electrode is typically formed of a nickel hydroxide material. A suitable separator, spacer, or membrane may be positioned between the negative and positive electrodes.

Upon application of electrical current to the negative electrode of a hydrogen storage cell, the negative electrode material (M) is charged by the electrolytic decomposition of water to form a hydride and a hydroxide (OH) ion. Upon discharge, the hydride is decomposed, to release hydrogen within the cell which reacts with the OH-ion to form water. An electron is released to the external circuit to provide an electric current. These reactions are reversible:

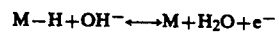

The chemical reactions that take place at the positive electrode of a hydrogen storage cell are also reversible. For example, the reactions at a conventional nickel hydroxide positive electrode in a hydrogen rechargeable secondary cell or battery are:

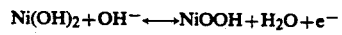

Hydrogen storage cells operate with a nickel hydroxide positive electrode and a hydrogen storage alloy negative electrode, and a non-woven, felted, nylon or polypropylene separator. The electrolyte is generally 20 to 45 weight percent potassium hydroxide.

Ni-MH batteries were previously classified based on whether they used $AB_2$ or $AB_5$ alloys as the hydrogen storage material of the negative electrode. Both types of material are discussed in detail in copending U.S. patent application Ser. No. 934,976, referenced above. The distinction between $AB_2$ or $AB_5$ alloys has disappeared as they have evolved.

By forming metal hydride alloys from such disordered materials, Ovshinsky and his team were able to greatly increase the reversible hydrogen storage characteristics required for efficient and economical battery applications, and produce batteries having high density energy storage, efficient reversibility, high electrical efficiency, bulk hydrogen storage without structural change or poisoning, long cycle life, and deep discharge capability. The improved characteristics of these alloys results from tailoring the local chemical order and hence the local structural order by the incorporation of selected modifier elements into a host matrix. Disordered metal hydride alloys have a substantially increased density of catalytically active sites and storage sites compared to single or multi-phase crystalline materials. These additional sites are responsible for improved efficiency of electrochemical charging/discharging and an increase in electrical energy storage capacity. The nature and number of storage sites can even be designed independently of the catalytically active sites. More specifically, these alloys are tailored to allow bulk storage of the dissociated hydrogen atoms at bonding strengths within the range of reversibility suitable for use in secondary battery applications.

Based on the principles described above, some extremely efficient electrochemical hydrogen storage materials were formulated. These are the Ti-V-Zr-Ni type active materials such as disclosed in U.S. Pat. No. 4,551,400 ("the '400 patent") to Sapru Hong, Fetcenko, and Venkatesan, the disclosure of which is incorporated by reference. These materials reversibly form hydrides in order to store hydrogen. All the materials used in the '400 patent utilize a generic Ti-V-Ni composition, where at least Ti, V, and Ni are present with at least one or more of Cr, Zr, and Al. The materials of the '400 patent are multiphase materials, which may contain, but are not limited to, one or more $AB_2$ phases with $C_{14}$ and $C_{15}$ type crystal structures.

Other Ti-V-Zr-Ni alloys are also used for rechargeable hydrogen storage negative electrodes. One such family of materials are those described in U.S. Pat. No. 4,728,586 ("the '586 patent") to Venkatesan, Reichman, and Fetcenko, the disclosure of which is incorporated by reference. The '586 patent describes a specific subclass of these Ti-V-Ni-Zr alloys comprising Ti, V, Zr, Ni, and a fifth component, Cr. The '586 patent, mentions the possibility of additives and modifiers beyond the Ti, V, Zr, Ni, and Cr components of the alloys, and generally discusses specific additives and modifiers, the amounts and interactions of these modifiers, and the particular benefits that could be expected from them.

The V-Ti-Zr-Ni family of alloys described in the '586 patent has an inherently higher discharge rate capability than previously described alloys. This is the result of substantially higher surface areas at the metal/electrolyte interface for electrodes made from V-Ti-Zr-Ni materials. The surface roughness factor (total surface area divided by geometric surface area) of V-Ti-Zr-Ni alloys is about 10,000. This value indicates a very high surface area. The validity of this value is supported by the inherently high rate capability of these materials.

The characteristic surface roughness of the metal electrolyte interface is a result of the disordered nature of the material. Since all of the constituent elements, as well as many alloys and phases of them, are present throughout the metal, they are also represented at the surfaces and at cracks which form in the metal/electrolyte interface. Thus, the characteristic surface roughness is descriptive of the interaction of the physical and chemical properties of the host metals as well as of the alloys and crystallographic phases of the alloys in an alkaline environment. These microscopic chemical, physical, and crystallographic parameters of the individual phases within the hydrogen storage alloy material are believed to be important in determining its macroscopic electrochemical characteristics.

In addition to the physical nature of its roughened surface, it has been observed that V-Ti-Zr-Ni alloys tend to reach a steady state surface condition and particle size. This steady state surface condition is characterized by a relatively high concentration of metallic nickel. These observations are consistent with a relatively high rate of removal through precipitation of the oxides of titanium and zirconium from the surface and a much lower rate of nickel solubilization. The resultant surface seems to have a higher concentration of nickel than would be expected from the bulk composition of the negative hydrogen storage electrode. Nickel in the metallic state is electrically conductive and catalytic, imparting these properties to the surface. As a result, the surface of the negative hydrogen storage electrode is more catalytic and conductive than if the surface contained a higher concentration of insulating oxides.

The surface of the negative electrode, which has a conductive and catalytic component—the metallic nickel—appears to interact with chromium alloys in catalyzing various hydride and hydride reaction steps. To a large extent, many electrode processes, including competing electrode processes, are controlled by the presence of chromium in the hydrogen storage alloy material, as disclosed in the '586 patent.

In contrast to the $AB_2$ alloys described above, the $AB_5$ alloys were generally considered "ordered" materials that had a different chemistry, microstructure, different electrochemical characteristics compared to the $AB_2$ alloys. However, while this appears to have been true for the early $AB_5$ alloys, it is not true for the more recently developed ones.

The performance of the early ordered $AB_5$ materials was poor, but in the early 1980's, as the degree of modification increased (that is as the number and amount of elemental modifiers increased), their performance began to improve significantly. This is due as much to the disorder contributed by the modifiers as it is to their electrical and chemical properties. This evolution of $AB_5$ type alloys from a specific class of "ordered" materials to the current multicomponent, multiphase "disordered" alloys that are very similar to $AB_2$ alloys is shown in the following patents: (i) U.S. Pat. No. 3,874,928; (ii) U.S. Pat. No. 4,214,043; (iii) U.S. Pat. No. 4,107,395; (iv) U.S. Pat. No. 4,107,405; (v) U.S. Pat. No. 4,112,199; (vi) U.S. Pat. No. 4,125,688 (vii) U.S. Pat. No. 4,214,043; (viii) U.S. Pat. No. 4,216,274; (ix) U.S. Pat. No. 4,487,817; (x) U.S. Pat. No. 4,605,603; (xii) U.S. Pat. No. 4,696,873; and (xiii) U.S. Pat. No. 4,699,856. (These references are discussed extensively in U.S. Pat. No. 5,096,667 and this discussion is specifically incorporated by reference).

Simply stated, in the $AB_5$ alloys, like the $AB_2$ alloys, as the degree of modification increases, the role of the initially ordered base alloy is of minor importance compared to the properties and disorder attributable to the particular modifiers. In addition, analysis of the current multiple component $AB_5$ alloys indicates that current $AB_5$ alloy systems are modified following the guidelines established for $AB_2$ systems. Thus, highly modified $AB_5$ alloys are identical to $AB_2$ alloys in that both are disordered materials that are characterized by multiple components and multiple phases and there no longer exists any significant distinction between these two types of multicomponent, multiphase alloys.

Hydrogen storage cells offer important advantages over conventional secondary cells. Hydrogen storage cells have significantly higher specific charge capacities (both in terms of ampere hours per unit mass and ampere hours per unit volume) than do cells that use lead or cadmium negative electrodes. As a result of the higher specific charge capacities, a higher energy density (in terms of watt hours per unit mass or watt hour per unit volume) is possible with a hydrogen storage cell than is possible with prior art systems. Thus, hydrogen storage cells are particularly suitable for many commercial applications.

The operation of a hydrogen storage cell produces hydroxide ions, and may also produce various hydrogen gases under certain circumstances. As a result, the internal cell pressures may vary substantially during operation of a hydrogen storage cell. Because of this, hydrogen storage cells are typically produced as either sealed cells or vented cells. During normal operation, a sealed cell does not permit the venting of gas to the atmosphere. In contrast, a vented cell will release excess pressure by venting gas as part of its normal operation. As a result of this difference, the vent assemblies used in sealed and vented cells are quite different from one another, and the amounts of electrolyte in the cell container relative to the electrode geometry differ significantly.

Sealed cells are manufactured predominantly in cylindrical and rectangular configurations. Sealed cells are usually designed to operate in a starved electrolyte configuration. The cell enclosure for a sealed cell is normally metallic and designed for operation at pressures up to about 100 pounds per square inch absolute or even higher. Sealed cells are characterized by the substantial absence of any required maintenance.

The discharge capacity of the nickel positive electrode is limited by the amount of electrolyte, the amount of active material and charging efficiencies. The charge capacity of the negative, hydrogen storage alloy electrode is limited by the amount of active material used since its charge efficiency is nearly 100 percent. To maintain the optimum capacity of the hydrogen storage electrode, precautions must be taken to avoid oxygen recombination or hydrogen evolution before full charge is reached. This is generally accomplished by providing an excess of negative electrode material. However, precautions must be taken in the design fabrication of sealed cells to avoid effects of over-pressurization associated with overcharge at dangerously high charge rates.

While rechargeable cells can be used without deleterious effect in most applications, there are many instances in which damage, of the type described hereinabove, may occur to the cells. For instance, during periods of abusive overcharging for extended lengths of time, excess pressure can be generated inside the cell can. As the internal pressure increases, so also does the danger of an explosive failure. Accordingly, some means must be provided to safely release excess pressure, thereby avoiding the unsafe condition of container failure, which may be referred to as rupture.

Cylindrical, rechargeable cells of the prior art include a "one time only" venting mechanism where, for example, a rupturable diaphragm and blade apparatus is employed. As internal cell pressure increases, the blade is forced against the diaphragm. As the pressure increases further, the blade punctures the diaphragm. This destructive type of venting mechanism is both unpredictable from batch to batch and from cell to cell within a batch. Moreover, destructive venting is good for only one excess pressure situation. After the diaphragm is punctured it cannot even sustain normal cell operating pressures. In one embodiment of such "one time only" venting, the diaphragm is punctured by an upward driven plunger. In another embodiment, the diaphragm is forced upward towards the incising blade. As the internal cell pressure reaches the critical level, i.e., as the diaphragm reaches a critical deformation, the diaphragm is forced against the incising blade which would thus puncture the diaphragm, allowing the escape of accumulated cell pressure. An example of this type of device is fully disclosed in U.S. Pat. No. 3,415,690, the disclosure of which is incorporated herein by reference.

Vented cells, which have a nickel hydroxide positive electrode, and a hydrogen storage alloy negative electrode, typically employ a woven or non-woven separator, of e.g. nylon or polypropylene. Vented cells differ most significantly from sealed cells in that they operate in a flooded condition. A "flooded condition", as used herein, refers to an electrochemical cell in which the electrodes are completely immersed in electrolyte. Thus, such electrochemical cells are sometimes referred to as "flooded cells." A vented cell is further distinguished from a sealed cell in that it is designed for normal operating pressures of only up to about 25 pounds per square inch, after which excess pressures are relieved by a vent mechanism.

One shortcoming present in this and other methods of venting rechargeable electrochemical cells is that the venting mechanism present therein is a "one time only" mechanism. Once vent integrity is broken and the electrolyte material inside this rechargeable cell is exposed to the surrounding atmosphere, the electrolyte levels are disturbed and thus the ability of the cell to retain and dispense an electrochemical charge would be deleteriously affected. Another shortcoming is the dependence of venting on the movement of a thin, deformable diaphragm against the incising blade.

Unfortunately, many prior art assemblies either fail to reliably vent at a given internal cell pressure or "stick" open, thereby causing the evaporation of the electrolyte material. The result, of course, is failure of the rechargeable cell. An example of this type of ventable cover assembly is fully disclosed in U.S. Pat. No. 3,944,749, to Decker, et al., the disclosure of which is incorporated herein by reference.

Cell cover assemblies such as those disclosed by Decker, et al., or in U.S. Pat. No. 4,298,662 to Sugalski, et al., are specifically adapted for use in nickel-cadmium (Ni-Cd) cells, which cells do not evolve hydrogen at either the positive or negative electrode. Accordingly, the vent septum employed to seal the vent orifice of Ni-Cd cells is not capable of preventing the escape of hydrogen gas from the interior of metal-hydride hydrogen storage alloy electrochemical cells.

As discussed above, operation of a hydrogen storage cell produces hydroxide ions and various hydrogen gases. The amount of gases generated depends on the amount of electrolyte, the operating temperature, as well as variations in components, chemical concentrations, and manufacturing techniques, as well as end user abuses, such as, over charging, etc.

Therefore, there is a need in the art for a resealable (i.e., non-"one-time-only") pressure vent assembly for metal hydride electrochemical cells, which reliably vents internal cell gases at the desired internal pressure, reseals automatically after the internal pressure has been reduced, is highly hydrogen impermeable (to both diffusion and leakage), and is relatively maintenance free.

BRIEF SUMMARY OF THE INVENTION

The electrochemical cell of the instant invention includes a case having a gas outlet, one or more positive electrodes positioned within the case, one or more negative electrodes positioned within the case electrode separators positioned between the positive and negative electrodes, electrolyte positioned within the case, and a pressure vent for releasing internal pressure occurring in the case to the surrounding atmosphere. The pressure vent is affixed to the case covering the gas outlet, the pressure vent includes a vent housing having a hollow interior area in gaseous communication with the surrounding atmosphere and the interior of the case via the gas outlet, a pressure release piston positioned within the hollow interior area, the pressure release piston sized to surround the gas outlet and having a seal groove configured to encapsulate all but one surface of a seal mounted within the seal groove, leaving the non-encapsulated surface of the seal exposed, and a compression spring positioned to urge the pressure release piston to compress the seal in the seal groove and block the gas outlet in the case.

The seal is preferably an o-ring and forms a pressure seal between the piston base and the vent housing base. The seal is preferably formed from a low hydrogen permeability material such as a butadiene acrylonitrile co-polymer.

The vent housing assembly, pressure release piston, and compression spring are formed of a material which is chemically compatible with the battery materials, preferably, stainless steel. More preferably, the vent housing and pressure release piston are formed from 304 L Stainless Steel and the compression spring is formed from 717 Stainless Steel. The negative electrode is formed from a hydrogen storage alloy which has either a disordered or crystalline structure. The disordered structure may be one or more of polycrystalline microcrystalline or amorphous form. Preferably, the positive electrode is formed from nickel hydroxide or modified nickel hydroxide.

BRIEF SUMMARY OF THE DRAWINGS

FIG. 1 is highly stylized partial cross section, not to scale, of a metal-hydride electrochemical cell indicating the components of the cell and specifically depicting one embodiment of the attachment of the pressure vent to the cell case.

DETAILED DESCRIPTION OF THE INVENTION

Figure 3:
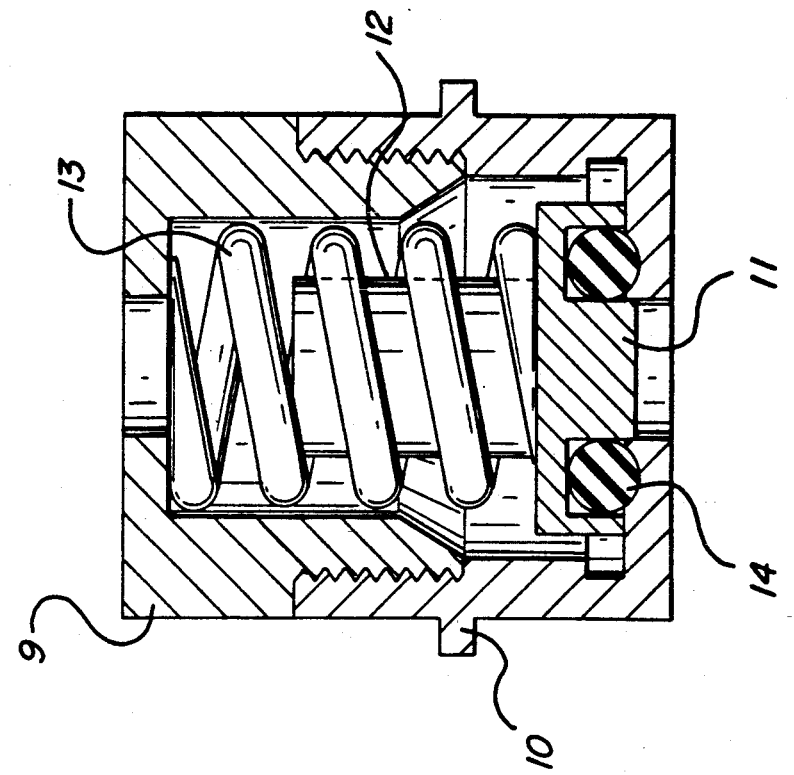
FIG. 3 is a cross sectional depiction of a second embodiment of the resealable pressure vent assembly for use in the electrochemical cell of the instant invention.

FIG. 1 is a highly stylized depiction of an electrochemical cell 1 of the instant invention having a resealable pressure vent assembly 7 attached thereto. The pressure vent assembly 7 reliably vents internal cell gases to the outside atmosphere at a desired internal pressure. The vent reseals automatically after the internal pressure has been reduced. The vent seal is highly hydrogen impermeable to both diffusion and leakage and the vent is relatively maintenance free.

The electrochemical cell 1 includes a case 2 which is formed from a material which is compatible with the electrochemistry of the cell and is preferably formed of stainless steel. However, the case 2 may be formed from other materials such as lightweight plastics when weight is a consideration in the consumer use of the electrochemical cell. The cell case 2 has a gas outlet 3 therein, over which is positioned the pressure vent assembly 7.

Positioned within the case 2 are one or more positive electrodes 4, one or more negative electrodes 5, electrode separators 6 positioned between the positive and negative electrodes, and electrolyte (not shown). The positive electrode 4 may be formed from any material known in the prior art for forming such positive electrodes. Preferably the positive electrodes 4 are formed from a nickel hydroxide material with or without cobalt modification. The negative electrodes 5 may be formed from any prior art material known for forming such negative electrodes. Preferably, the negative electrodes 5 are formed from hydrogen storage alloys such as those discussed hereinabove. The hydrogen storage alloys may be in either disordered or crystalline form. Disordered forms include one or more of polycrystalline, microcrystalline, or amorphous material. The electrode separator 6 may be formed from any material known in the prior art for forming electrode separators and is preferably a woven polymeric material. The electrolyte may be any electrochemical cell electrolyte known in the prior art which is compatible with the chosen electrodes and electrode separators. Preferably, the electrolyte is a potassium hydroxide solution.

Attached to the exterior of the cell case 2 and in electrical connection with the electrodes are battery electrical terminal 8. While the depiction in FIG. 1 indicates that the pressure vent assembly 7 and electrical terminals 8 are separate and distinct features, it may in some instances be useful for pressure vent assembly 7 to additionally act as one or both of the electrical terminals for the electrochemical cell.

Figure 2:
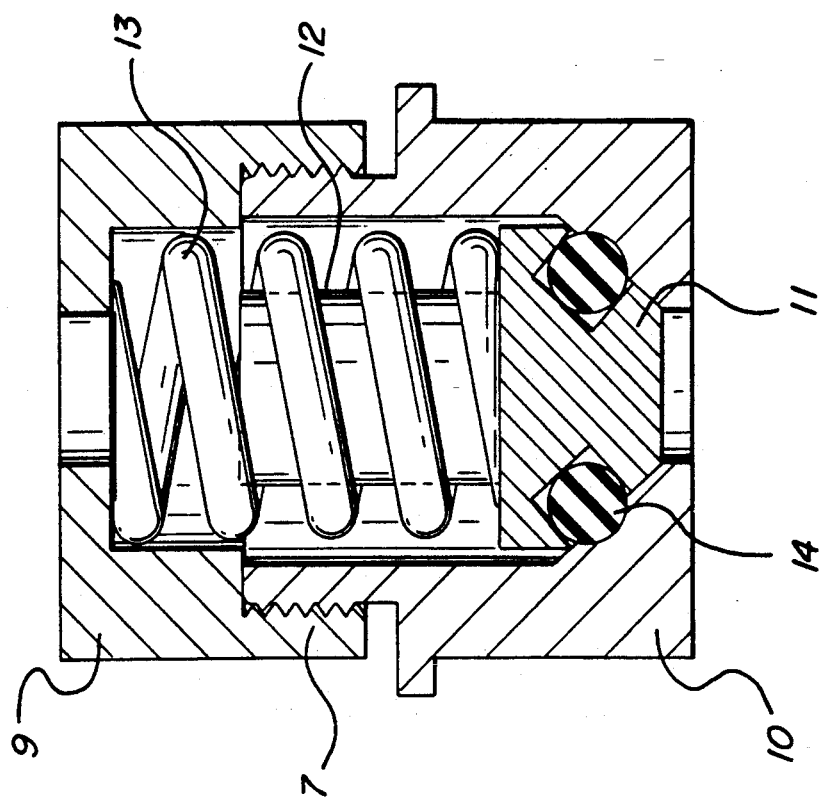
FIG. 2 is a cross sectional depiction of a first embodiment of the resealable pressure vent assembly for use in the electrochemical cell of the instant invention.

FIGS. 2 and 3 are cross sectional depictions of three embodiments of the pressure vent assembly 7 for use in the electrochemical cell of the instant invention. The vent assembly 7 includes a vent housing cap 9 and a vent housing base 10, which together form the vent housing assembly. The vent housing assembly has a hollow interior area which is in gaseous communication with the surrounding atmosphere and the interior of the case via the gas outlet 3. The vent housing base 10 is affixed to the cell case 2 covering gas outlet 3. The vent housing base 10 may be affixed to the case 2 in any manner which is compatible with the electrochemistry of the cell and can withstand the pressure differential between the interior and exterior of the electrochemical cell. For example, the vent housing base may be affixed to the case 2 by welding, soldering, brazing, adhesive, or it may be mechanically threaded into the case. Welding the housing base 10 to the case 2 is preferable when the case 2 is formed of stainless steel. The vent housing cap 9 is affixed to the vent housing base 10, preferably by mechanical threading. Particularly preferred is the embodiment of FIG. 2 in which the threads are positioned on the exterior of the vent housing base 10 and the interior of the vent housing cap 9.

The pressure vent 7 additionally includes a pressure release piston positioned within the hollow interior of the vent housing. The pressure release piston is sized to surround the gas outlet 3 and has a seal groove 14 configured to encapsulate all but one surface of a seal leaving the non-encapsulated surface of the seal exposed. The pressure relief piston includes a piston base 11 and a piston shaft 12. The piston base 11 has one end positioned over the gas outlet 3 and the opposite end attached to the piston shaft 12. The seal groove 14 is in the end of the piston base 11 which is positioned over the gas outlet 3. Preferably, the piston shaft 12 has a diameter smaller than the largest diameter of the piston base 11.

The pressure vent assembly also includes a seal (shown but not enumerated) mounted within and encapsulated by the seal groove 14. The term "encapsulated" when used in reference to the seal and the seal groove 14 is meant to define a situation in which the seal groove is of such a shape and size as to nearly completely surround the seal leaving only a single surface exposed to form a seal between the piston base 11 and the vent housing base 10. This encapsulated configuration captures the seal in such a way as to ensure that the seal is always properly adjusted and positioned to form the required pressure seal between the pressure release piston and the vent housing base, even after a vent situation. The seal itself is preferably an O-ring and should be formed from a low hydrogen permeability material such as a butadiene-acrylonitrile co-polymer.

The pressure vent assembly 7 additionally includes a compression spring 13 positioned to urge the pressure release piston to compress the seal in the seal groove 14 and to block the gas outlet 3 in the cell case 2. The compression spring is compressed between the vent housing cap 9 and the piston base 11 and surrounds the piston shaft 12. Preferably, the pressure vent assembly 7 which includes the vent housing base 10, the vent housing cap 9, the piston base 11, the piston shaft 12, and the compression 13 are all generally cylindrical, however, other shapes such as rectangular, cubic, pentagonal, etc. may be envisioned and substituted for the cylindrical vent assembly described herein.

The vent housing assembly, pressure release piston, and compression spring may be formed from any material which is compatible with the electrochemistry of the cell. Preferably they are formed from a stainless steel material. More preferably, the vent housing and pressure release piston are formed from 304 L stainless steel which is highly corrosion resistant and is easily machinable. The compression spring 13 is preferably formed from 717 stainless steel.

The pressure vents of the present invention have been found to vent reliably and to be reusable/resealable. The data provided in Table 1 was collected in an experiment where pressure vents of the instant invention were forced to vent, allowed to reseal and thereafter vented again. The data presented in Table 1 indicates that pressure vents of the present invention vent reliably at a consistent pressure and that even after venting and resealing, the vents are capable of again venting at the same pressure as before.

In addition to the venting test previously described, an additional reliability test was performed. This test constituted repetitious venting, disassembly and reassembly of samples of the pressure vent of the instant invention. It should be noted that the vent pressure, after each subsequent disassembly/reassembly does not vary by more than plus or minus 10 pounds per square inch. The test data presented in Table 2 clearly indicates that the vent pressure of the instant pressure vents is relatively insensitive to the assembly procedure. That is, for any particular one vent of the instant invention, the human variability of the assembly thereof will not affect the reliability of the vent pressure to any appreciable extent. Therefore, the vent can remain reliable and reusable even after service/maintenance of the electrochemical cell to which it is attached.

While the invention has been described with respect to certain preferred embodiments, these embodiments are not intended to limit the scope of the invention. Rather, the invention is described in the following claims and all reasonable equivalents thereof.

TABLE 1

| Sample No. | Vent Pressure (p.s.i.) | | |
|---|---|---|---|
| | Test 1 | Test 2 | Test 3 |
| 1 | 120 | 120 | 120 |
| 2 | 115 | 115 | 115 |
| 3 | 118 | 118 | 118 |
| 4 | 115 | 115 | 115 |
| 5 | 110 | 110 | 110 |
| 6 | 108 | 108 | 108 |
| 7 | 126 | 126 | 126 |
| 8 | 120 | 120 | 120 |

TABLE 1-continued

| Sample No. | Vent Pressure (p.s.i.) | | |
|---|---|---|---|
| | Test 1 | Test 2 | Test 3 |
| 9 | 115 | 115 | 115 |

TABLE 2

| Sample No. | Vent Pressure (p.s.i.) | | | | | | | |
|---|---|---|---|---|---|---|---|---|
| | Test 1 | Test 2 | Test 3 | Test 4 | Test 5 | Test 6 | Test 7 | Test 8 |
| A | 113 | 112 | 120 | 120 | 110 | 110 | 113 | 113 |
| B | 128 | 128 | 128 | 128 | 124 | 122 | 120 | 120 |
| C | 115 | 115 | 113 | 108 | 120 | 120 | 122 | 122 |
| D | 118 | 118 | 118 | 115 | 120 | 120 | 116 | 116 |
| E | 115 | 115 | 120 | 118 | 112 | 112 | 118 | 116 |

We claim:

1. An electrochemical cell comprising:
   (a) a case having a gas outlet;
   (b) one or more positive electrodes positioned within said case;
   (c) one or more negative electrodes positioned within said case;
   (d) electrode separators positioned between said positive and negative electrodes;
   (e) electrolyte positioned within said case; and
   (f) a pressure vent for releasing internal pressure occurring in said case to the surrounding atmosphere, said pressure vent affixed to said case covering said gas outlet, said pressure vent comprising:
       (i) a vent housing having a hollow interior area in gaseous communication with said surrounding atmosphere and the interior of said case via said gas outlet;
       (ii) a pressure release piston positioned within said hollow interior area, said pressure release piston sized to surround said gas outlet and having a seal groove configured to encapsulate all but one surface of a seal mounted within said seal groove, leaving the non-encapsulated surface of said seal exposed; and
       (iii) a compression spring positioned to urge said pressure release piston to compress said seal in said seal groove and block said gas outlet in said case.

2. The electrochemical cell of claim 1, wherein said vent housing comprises a vent housing base affixed to said case, covering said vent outlet and a vent housing cap affixed to said vent housing base, and said compression spring is compressed against said vent housing cap.

3. The electrochemical cell of claim 2, wherein said vent housing base and vent housing cap are generally cylindrical and each has a hollow central axis.

4. The electrochemical cell of claim 2, wherein said pressure release piston is generally cylindrical.

5. The electrochemical cell of claim 4, wherein said pressure release piston comprises a piston base having one end positioned over said gas outlet and the opposite end attached to a piston shaft.

6. The electrochemical cell of claim 5, wherein said seal grove is in the end of said piston base positioned over said gas outlet.

7. The electrochemical cell of claim 5, wherein said piston shaft has a diameter smaller than the largest diameter of said piston base.

8. The electrochemical cell of claim 5, wherein said compression spring is generally cylindrical.

9. The electrochemical cell of claim 5, wherein said compression spring is positioned around said piston shaft between said piston base and said vent housing cap.

10. The electrochemical cell of claim 9, wherein said seal in said seal groove forms a pressure seal between said piston base and said vent housing base.

11. The electrochemical cell of claim 1, wherein said seal is an o-ring.

12. The electrochemical cell of claim 1, wherein said seal is formed from a low hydrogen permeability material.

13. The electrochemical cell of claim 12, wherein said seal is formed of a butadiene acrylonitrile co-polymer.

14. The electrochemical cell of claim 1, wherein said vent housing assembly, said pressure release piston, and said compression spring are formed from stainless steel.

15. The electrochemical cell of claim 14, wherein said vent housing and said pressure release piston are formed from 304 L stainless steel and said compression spring is formed from 717 stainless steel.

16. The electrochemical cell of claim 1, wherein said one or more negative electrodes comprise a hydrogen storage alloy.

17. The electrochemical cell of claim 16, wherein said hydrogen storage alloy is disordered or crystalline in structure.

18. The electrochemical cell of claim 17, wherein said disordered hydrogen storage alloy comprises hydrogen storage alloys in one or more of polycrystalline, microcrystalline, or amorphous form.

19. The electrochemical cell of claim 1, wherein said one or more positive electrodes comprise nickel hydroxide.

* * * * *